United States Patent
Nagata et al.

(10) Patent No.: US 11,726,361 B2
(45) Date of Patent: Aug. 15, 2023

(54) IN-CELL TOUCH PANEL

(71) Applicant: Sharp Display Technology Corporation, Kameyama (JP)

(72) Inventors: Kosuke Nagata, Kameyama (JP); Kazutoshi Kida, Kameyama (JP); Daiji Kitagawa, Kameyama (JP)

(73) Assignee: SHARP DISPLAY TECHNOLOGY CORPORATION, Kameyama (JP)

( * ) Notice: Subject to any disclaimer, the term of this patent is extended or adjusted under 35 U.S.C. 154(b) by 0 days.

(21) Appl. No.: 17/886,521

(22) Filed: Aug. 12, 2022

(65) Prior Publication Data

US 2023/0060098 A1 Feb. 23, 2023

(30) Foreign Application Priority Data

Aug. 19, 2021 (JP) ................................ 2021-133885
Apr. 21, 2022 (JP) ................................ 2022-070434

(51) Int. Cl.
*G02F 1/1333* (2006.01)
*G06F 3/044* (2006.01)
*G06F 3/041* (2006.01)

(52) U.S. Cl.
CPC ........ *G02F 1/13338* (2013.01); *G06F 3/0444* (2019.05); *G06F 3/0446* (2019.05); *G06F 3/04164* (2019.05)

(58) Field of Classification Search
CPC .. G06F 3/04164; G06F 3/0444; G06F 3/0446; G02F 1/13338
USPC ........................................................ 345/173
See application file for complete search history.

(56) References Cited

U.S. PATENT DOCUMENTS

| | | |
|---|---|---|
| 2019/0012013 A1 | 1/2019 | Teranishi |
| 2019/0179180 A1 | 6/2019 | Chung et al. |
| 2021/0124223 A1 | 4/2021 | Murata et al. |
| 2021/0149511 A1* | 5/2021 | Chung .................. G06F 3/0416 |
| 2021/0407454 A1 | 12/2021 | Owaki |

FOREIGN PATENT DOCUMENTS

| | | |
|---|---|---|
| JP | 2020-148869 A | 9/2020 |
| JP | 6848043 B2 | 3/2021 |
| JP | 2021-067852 A | 4/2021 |
| JP | 6857563 B2 | 4/2021 |

* cited by examiner

*Primary Examiner* — Mark Edwards
(74) *Attorney, Agent, or Firm* — Keating & Bennett, LLP

(57) ABSTRACT

An in-cell touch panel includes a mode switching control circuit and a counter substrate electrode control circuit. The mode switching control circuit switches, in a time-division manner, the operation mode of the in-cell touch panel between a display mode in which a display signal is supplied by a display control circuit to pixel electrodes, and a touch detection mode in which a driving signal is supplied by a driving control circuit to touch sensor electrodes. The counter substrate electrode control circuit supplies a counter substrate electrode with a signal that is in synchronization with the driving signal and that has the same polarity as that of the driving signal in a period while the in-cell touch panel is in the touch detection mode, or causes the potential of the counter substrate electrode to be in a floating state in a period while the in-cell touch panel is in the touch detection mode.

8 Claims, 25 Drawing Sheets

| Embodiment | Potential of electrode in touch detection mode | Value of touch signal |
|---|---|---|
| Embodiment 1 | Load reduction signal (S5) | Value in touch-detectable range |
| Embodiment 2 | Floating (S5c) | Value in touch-detectable range |
| Comparative Example 1 | Ground voltage | Overflow |
| Comparative Example 2 | View angle control voltage | Overflow |

FIG.19

IN-CELL TOUCH PANEL

This application claims the benefit of priority to Japanese Patent Application Number 2021-133885 filed on Aug. 19, 2021 and Japanese Patent Application Number 2022-070434 filed on Apr. 21, 2022. The entire contents of the above-identified applications are hereby incorporated by reference.

TECHNICAL FIELD

The present disclosure relates to an in-cell touch panel.

BACKGROUND ART

An in-cell touch panel has been known conventionally. Such an in-cell touch panel includes thin film transistors, a thin film transistor substrate, touch sensor electrodes, and a counter substrate. The thin film transistors and the touch sensors are formed on the thin film transistor substrate. This in-cell touch panel is, in one frame period, alternately operated in a display mode in which the thin film transistors are driven, and a touch detection mode in which touch sensors are driven.

In addition, a liquid crystal display device in which viewing angle switching electrodes are formed on a counter substrate has been known conventionally. Such a liquid crystal display device is disclosed in, for example, JP-B-6848043.

In the liquid crystal display device disclosed in JP-B-6848043, an alternating voltage for controlling the viewing angle switching is output to viewing angle switching electrodes so that the mode is switched between a mode in which an image is displayed at a wide viewing angle, and a mode in which an image is displayed at a narrow viewing angle.

SUMMARY OF INVENTION

In a conventional in-cell touch panel, when an electrode that is not used in touch detection is formed on such a counter substrate as described in JP-B-6848043 mentioned above, capacitances that are loads are generated between the touch sensor electrodes and the counter substrate. Therefore, resulting from the capacitances that are loads between the touch sensor electrodes and the electrodes on the counter substrate, the generation of capacitances between the touch sensor electrodes and an indicator (a finger, a pen, or the like) is hindered. This results in a problem that the performance of touch detection in the in-cell touch panel deteriorates.

The present disclosure is intended to solve the above-described problem, and it is an object thereof to provide an in-cell touch panel that is capable of preventing the performance of touch detection from deteriorating even in a case where an electrode that is not used in touch detection is formed on a counter substrate.

To achieve the above-described object, an in-cell touch panel according to one aspect of the present disclosure includes: a touch sensor substrate; a pixel electrode formed on the touch sensor substrate; a touch sensor electrode formed on the touch sensor substrate; a counter substrate arranged to be opposed to the touch sensor substrate; a counter substrate electrode formed on the counter substrate, the counter substrate electrode being not used in touch detection; a liquid crystal layer arranged between the touch sensor substrate and the counter substrate; a driving control circuit that supplies a driving signal to the touch sensor electrode; a display control circuit that supplies a display signal to the pixel electrode; a mode switching control circuit that switches, in a time-division manner, an operation mode of the in-cell touch panel between a display mode in which the display signal is supplied by the display control circuit to the pixel electrode, and a touch detection mode in which the driving signal is supplied by the driving control circuit to the touch sensor electrode; and a counter substrate electrode control circuit that supplies the counter substrate electrode with a signal that is in synchronization with the driving signal and that has the same polarity as that of the driving signal in a period while the in-cell touch panel is in the touch detection mode, or causes the potential of the counter substrate electrode to be in a floating state in a period while the in-cell touch panel is in the touch detection mode.

In the case of the in-cell touch panel of the above-described configuration, the capacitances that are loads between the counter substrate electrode and the touch sensor electrode can be reduced, and therefore, the generation of capacitance between the touch sensor electrode and an indicator is not hindered. As a result, the performance of touch detection can be prevented from deteriorating even in a case where an electrode that is not used in touch detection is formed on a counter substrate.

BRIEF DESCRIPTION OF DRAWINGS

FIG. 19 is a diagram for explaining measurement results.

MODE FOR CARRYING OUT THE INVENTION

Figure 1:
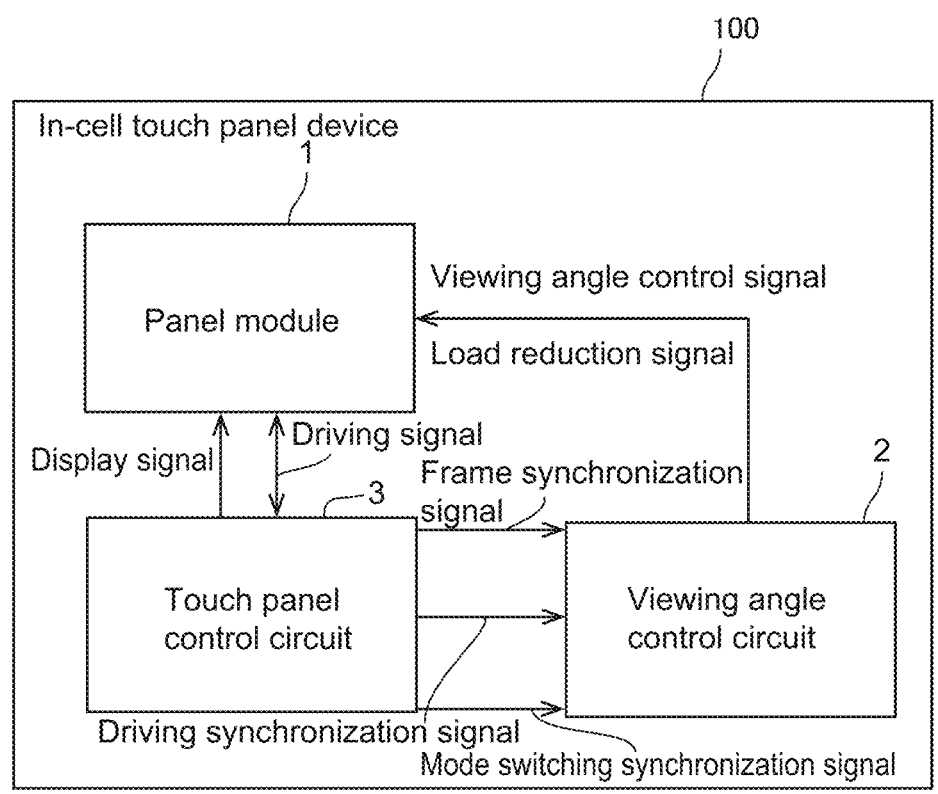
FIG. 1 is a block diagram of an in-cell touch panel device 100 in Embodiment 1.

The following description describes Embodiments of the present disclosure based on the drawings. The present disclosure is not limited by the embodiments described below, but design changes can be made appropriately as long as they are in accordance with the configuration of the present disclosure. In addition, in the description below, identical parts or parts having identical functions are denoted by identical reference marks commonly in different drawings, and repetitive descriptions of the parts are omitted. Further, configurations described in Embodiments and Modification Examples may be used in combination appropriately or may be changed without deviating the scope of the present disclosure. To make the description easy to understand, in the drawings referred to hereinafter, the configurations are simply illustrated or schematically illustrated, or the illustration of part of constituent members is omitted. Further, dimension ratios of constituent members illustrated in the drawings do not necessarily indicate actual dimension ratios.

Embodiment 1

FIG. 1 is a block diagram of an in-cell touch panel device 100 in Embodiment 1. As illustrated in FIG. 1, the in-cell touch panel device 100 includes a panel module 1, a viewing angle control circuit 2, and a touch panel control circuit 3. Note that in FIG. 1, the viewing angle control circuit 2 and the touch panel control circuit 3 are illustrated as separate circuits, but functions of both of the viewing angle control circuit 2 and the touch panel control circuit 3 may be realized by a single circuit (integrated circuit).

Figure 2A:
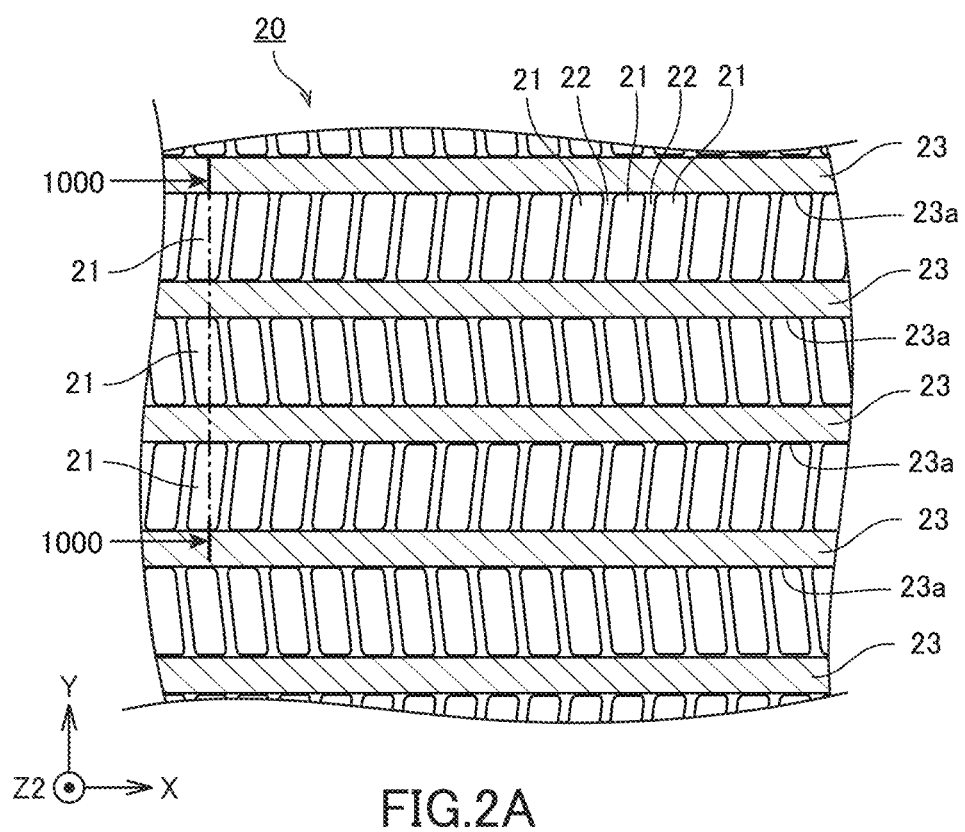
FIG. 2A is a plan view showing positions where a counter substrate electrode 23 is arranged.
Figure 2B:
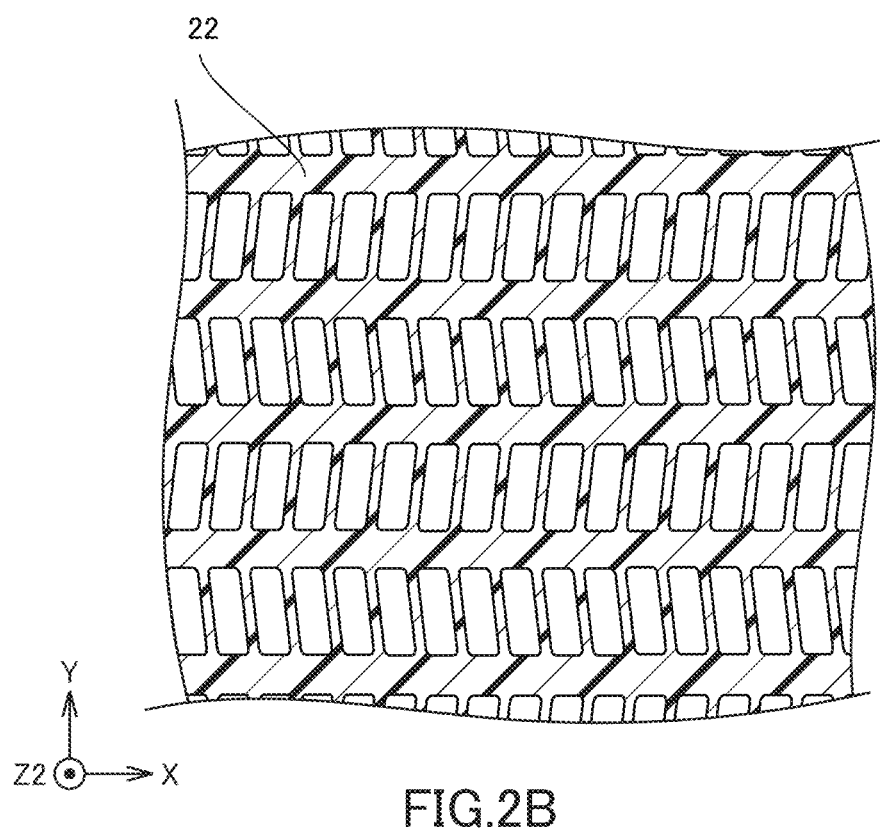
FIG. 2B is a plan view for explaining a position where a black matrix 22 is arranged.
Figure 3A:
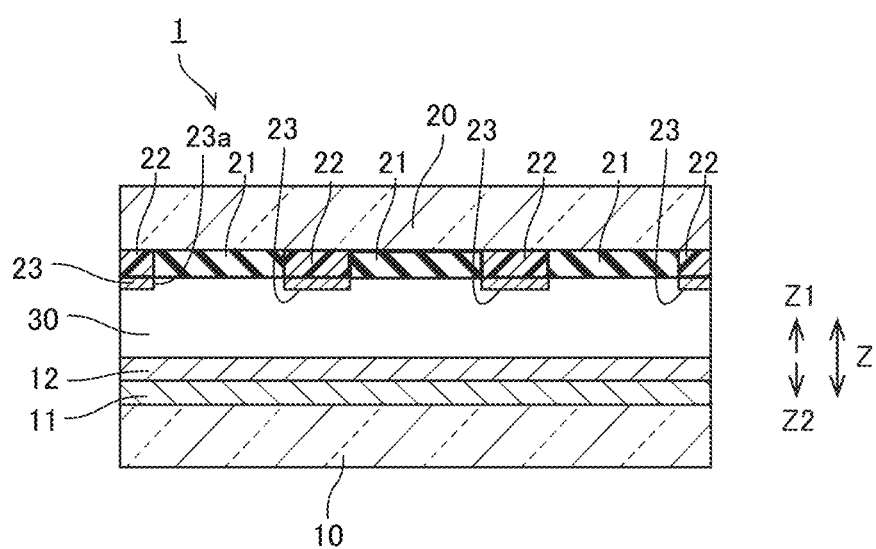
FIG. 3A is a cross-sectional view illustrating a panel module 1 taken along line 1000-1000 in FIG. 2A.

FIG. 2A is a plan view showing a position where a counter substrate electrode 23 is arranged. FIG. 2B is a plan view for explaining a position where a black matrix 22 is arranged. FIG. 3A is a cross-sectional view illustrating a panel module 1 taken along line 1000-1000 in FIG. 2A. As illustrated in FIG. 3A, the panel module 1 includes a touch sensor substrate 10, a counter substrate 20, and a liquid crystal layer 30 interposed between the touch sensor substrate 10 and the counter substrate 20. In addition, in the panel module 1, optical members (not shown) such as polarizing plates are provided so that the touch sensor substrate 10 and the counter substrate 20 are interposed therebetween. Further, on a surface of the panel module 1 (on the Z1 direction side to the panel module 1), a cover glass (not shown) is provided. Still further, on a back surface of the panel module 1 (on the Z2 direction side to the panel module 1), a backlight (not shown) is provided. Note that in FIG. 3A, the illustration of liquid crystal molecules 30a, an insulating layer 13, and pixel electrodes 11d is omitted.

The panel module 1 is configured so that an image is visually recognized by a user from the front side of the panel module 1. A surface (touch surface) of the panel module 1 receives, for example, a touch operation by a finger or the like (an indicator). In the panel module 1, liquid crystal molecules 30a included in the liquid crystal layer 30 are driven by the horizontal electric field driving method. To realize the horizontal electric field driving method, a thin film transistor layer 11 for forming an electric field (hereinafter referred to as a "TFT layer 11") is formed in the touch sensor substrate 10.

FIGS. 3B to 3E are cross-sectional views illustrating a configuration of the panel module 1. As illustrated in FIGS. 3B to 3E, the panel module 1 includes the TFT layer 11, touch sensor electrodes 12, and pixel electrodes 11d laminated thereon with the touch sensor electrodes 12 and the insulating layer 13 interposed. The touch sensor electrodes 12 and the pixel electrodes 11d are laminated with the insulating layer 13 interposed therebetween, and form an electrode structure of a fringe field switching (FFS) type. Examples of the material for the insulating layer 13 include inorganic materials such as silicon oxides and silicon nitrides.

The touch sensor electrode 12 is preferably a solid electrode. The touch sensor electrodes 12 may be arranged at a plurality of pixels, respectively, or may be arranged in such a manner that one touch sensor electrode 12 is provided commonly for a plurality of pixels. The "solid electrode" refers to an electrode in which no slit nor aperture is provided in a region that overlaps with an optical aperture of a pixel at least when viewed in a plan view. Examples of the material for the touch sensor electrode 12 include transparent conductive materials such as indium tin oxide (ITO) and indium zinc oxide (IZO).

Figure 4:
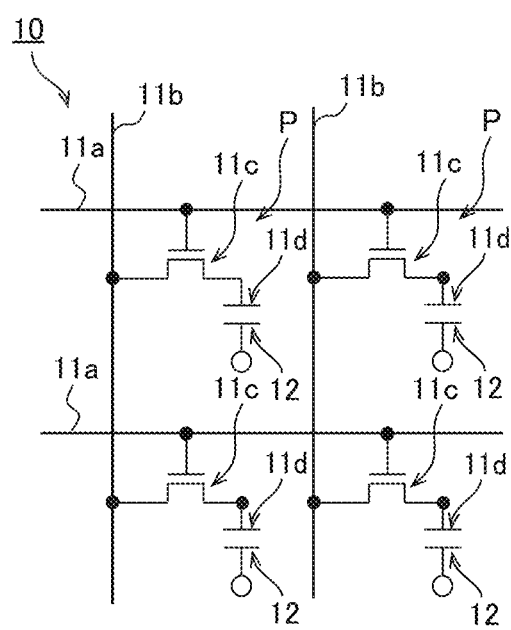
FIG. 4 illustrates a configuration of circuits formed on a touch sensor substrate 10.

FIG. 4 illustrates a configuration of circuits formed on the touch sensor substrate 10. A plurality of gate lines 11a, and a plurality of data lines 11b intersecting with the gate lines 11a are formed in the touch sensor substrate 10. A plurality of pixels P, defined by the data lines 11b and the gate lines 11a, are formed in the touch sensor substrate 10. In the pixel P, a thin film transistor (TFT) 11c and the pixel electrode 11d are provided. The pixel electrode 11d has a capacitance between the pixel electrode 11d and the touch sensor electrode 12 functioning as a counter electrode. The touch sensor electrode 12 is a common electrode arranged commonly with respect to a plurality of the pixel electrodes 11d. The gate of the TFT 11c is connected with the gate line 11a, the source of the TFT 11c is connected with the data line 11b, and the drain of the TFT 11c is connected with the pixel electrode 11d. Each of the pixel electrode 11d and the touch sensor electrode 12 is formed with a transparent conductive film such as ITO film, or a mesh-type metal film. Here, the TFT layer 11 shown in FIG. 3A includes a layer in which the gate lines 11a are formed, a layer in which the data lines 11b are formed, a layer in which the TFT 11c are formed, and a layer in which the pixel electrodes 11d are formed.

Further, as shown in FIG. 3A, a plurality of color filters 21 are formed on a liquid crystal layer 30 side of the counter substrate 20. The plurality of color filters 21 includes a red color filter, a green color filter, and a blue color filter. In addition, a black matrix 22 is formed in each space between the plurality of color filters 21. In addition, on the liquid crystal layer 30 side of the black matrix 22, the counter substrate electrode 23 is formed. The black matrix 22 is formed with, for example, a resin material having light shielding properties. The counter substrate electrode 23 is formed with, though not limited to, a metal film or a transparent conductive film of ITO or the like.

As shown in FIG. 2A, the counter substrate electrode 23 is formed at positions that partially overlap with the black matrix 22, when viewed in a plan view. More specifically, as shown in FIGS. 2A and 2B, the counter substrate electrode 23 is not arranged at positions that overlap with portions of the black matrix 22 arranged in X-direction spaces between the plurality of color filters 21. The counter substrate electrode 23 is arranged at positions that overlap with portions of the black matrix 22 arranged in Y-direction spaces between the plurality of color filters 21. According to this configuration, the counter substrate electrode 23 is arranged at positions that overlap with the black matrix 22 for blocking light. Therefore, even if light is absorbed or diffused by the counter substrate electrode 23, it does not affect the display. As a result, the counter substrate electrode 23, even if arranged on the counter substrate 20, does not affect the display. In addition, as the counter substrate electrode 23 does not block light entering the color filters 21, or light emitted from the color filters 21, the counter substrate electrode 23, even if arranged on the counter substrate 20, does not affect the display.

Figure 5:
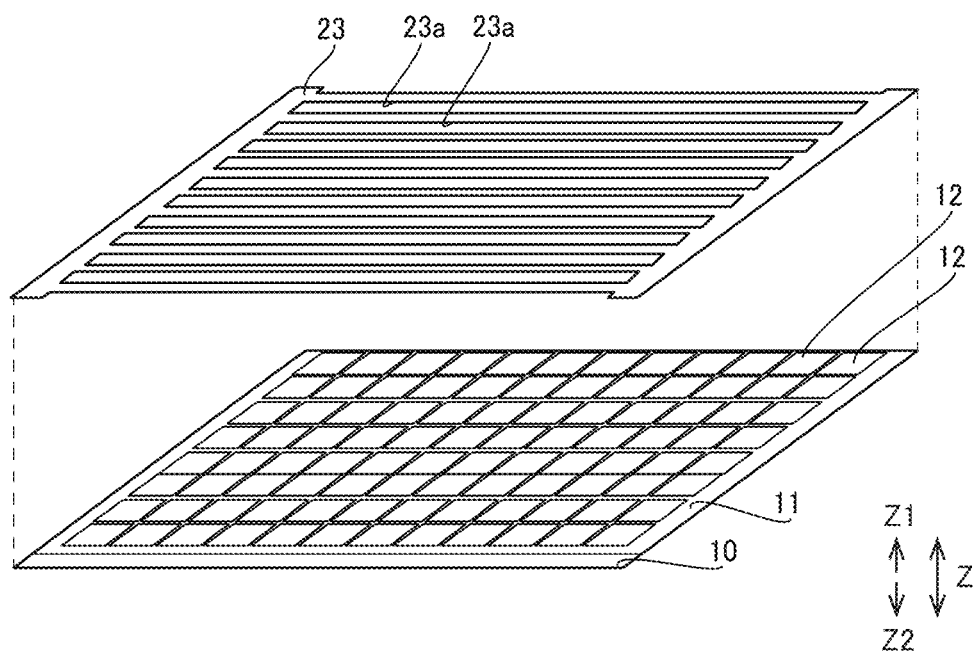
FIG. 5 is a schematic diagram showing positional relationship between the counter substrate electrode 23 and touch sensor electrodes 12.

FIG. 5 is a schematic diagram showing positional relationship between the counter substrate electrode 23 and touch sensor electrodes 12. As shown in FIG. 5, the counter substrate electrode 23 is formed in a lattice shape when viewed in a plan view. In addition, the touch sensor electrodes 12 are formed in matrix when viewed in a plan view. As shown in FIGS. 2A, 2B, and 5, in the counter substrate electrode 23, slits 23a are formed at positions that overlap with the color filters 21 when viewed in a plan view.

Figure 6:
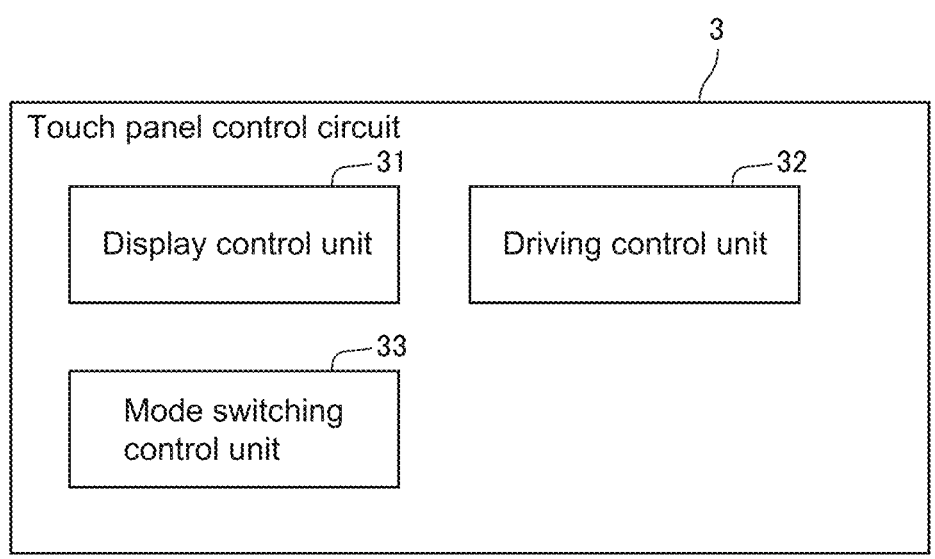
FIG. 6 is a functional block diagram of a touch panel control circuit 3.

FIG. 6 is a functional block diagram of the touch panel control circuit 3. As shown in FIG. 6, the touch panel control circuit 3 includes a display control unit 31, a driving control unit 32, and a mode switching control unit 33. The display control unit 31 supplies a data signal (display signal) through the data lines 11b to the TFTs 11c. In addition, the display control unit 31 supplies a gate signal through the gate lines 11a to the TFTs 11c, which turns the TFTs 11c on, thereby causing a data signal to be supplied to the pixel electrodes 11d. The driving control unit 32 supplies a driving signal to the touch sensor electrodes 12. The driving signal has, for example, a voltage waveform in a pulse form. The driving control unit 32 detects a touch based on a driving signal having a waveform changed according to capacitances generated between the touch sensor electrodes 12 and an indicator. The mode switching control unit 33 switches the operation mode of the in-cell touch panel device 100 between a display mode and a touch detection mode in a time-division manner. The display mode is a mode for supplying a data signal from the display control unit 31 to the pixel electrodes 11d. The touch detection mode is a mode for supplying a driving signal from the driving control unit 32 to the touch sensor electrodes 12. Incidentally, in FIG. 6, the display control unit 31, the driving control unit 32, and the mode switching control unit 33 are shown as functional blocks in the touch panel control circuit 3, but separate circuits may be provided for the functions, respectively.

Figure 3B:
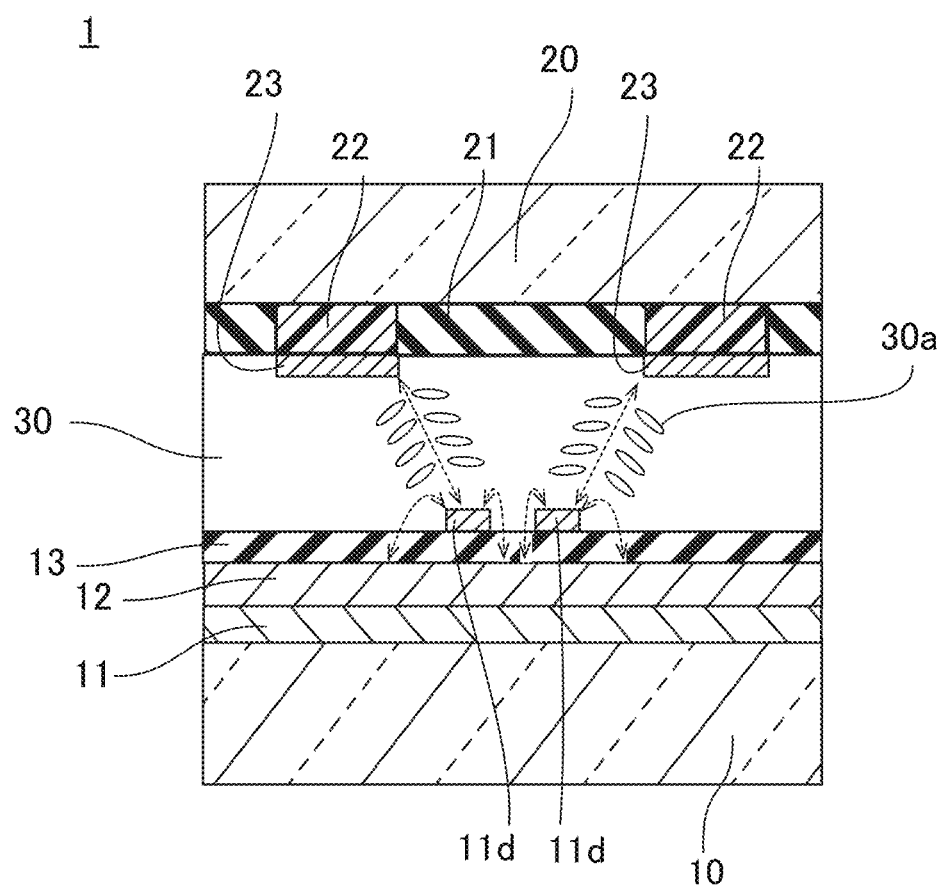
FIG. 3B is a cross-sectional view illustrating a state of the panel module 1 when a white display is performed in a narrow viewing angle mode.
Figure 7:
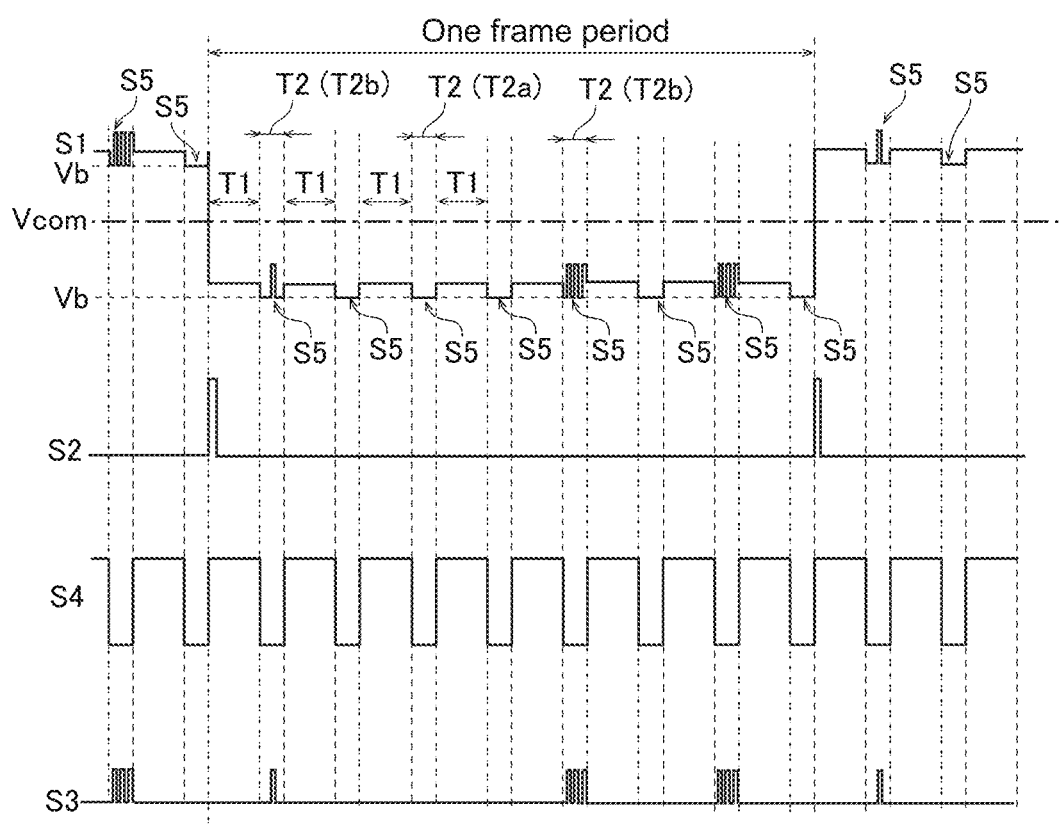
FIG. 7 illustrates exemplary waveforms of signals supplied from the touch panel control circuit 3 to a viewing angle control circuit 2 and signals supplied from the viewing angle control circuit 2 to the panel module 1.

FIG. 7 illustrates exemplary waveforms of signals supplied from the touch panel control circuit 3 to the viewing angle control circuit 2 and signals supplied from the viewing angle control circuit 2 to the panel module 1. As shown in FIG. 7, a voltage Vcom is applied to the touch sensor electrodes 12 from the touch panel control circuit 3. The viewing angle control circuit 2 supplies the counter substrate electrode 23 with a viewing angle control signal S1 for controlling a viewing angle. For example, when the viewing angle of the panel module 1 is set to a narrow viewing angle (hereinafter this mode is referred to as a "narrow viewing angle mode"), the viewing angle control circuit 2 supplies the viewing angle control signal S1 to the counter substrate electrode 23, thereby causing a potential difference to occur between the counter substrate electrode 23 and the touch sensor electrodes 12 (common electrodes). This causes an electric field to be generated in the liquid crystal layer 30, thereby narrowing the viewing angle of the panel module 1. For example, in the case of white display in the narrow viewing angle mode, the viewing angle control circuit 2, for example, performs a controlling operation of applying a constant voltage (common voltage Vcom) to either the touch sensor electrodes 12 or the pixel electrodes 11d, and applying a potential different from the common voltage Vcom to the other. In addition, the viewing angle control circuit 2 performs a controlling operation of applying an alternating voltage to the counter substrate electrode 23. The absolute value of the alternating voltage is preferably different from the absolute values of the voltages applied to the touch sensor electrodes 12 and the pixel electrodes 11d. One example is as follows: when the common voltage Vcom is applied to the pixel electrodes 11d, an alternating voltage that is ±4 V with respect to the common voltage Vcom is applied to the touch sensor electrodes 12, and an alternating voltage that is ±6 V with respect to the common voltage Vcom is applied to the counter substrate electrode 23. As shown in FIG. 3B, this causes fringe fields to be generate between the touch sensor electrodes 12 and the pixel electrodes 11d, and causes oblique electric fields that are oblique to the thickness direction of the liquid crystal layer 30 to be generated between the counter substrate electrode 23 on one side and the touch sensor electrodes 12 and the pixel electrodes 11d on the other side. As a result, an image on the panel module 1 can be observed in a narrow viewing angle range. On the other hand, as the liquid crystal molecules 30a in the liquid crystal layer 30 form angles with respect to the touch sensor substrate 10, changes such as an extreme decrease in the contrast occur to an image, which results in that an image is hardly observed, when the panel module 1 is observed in a wide viewing angle range.

Figure 3C:
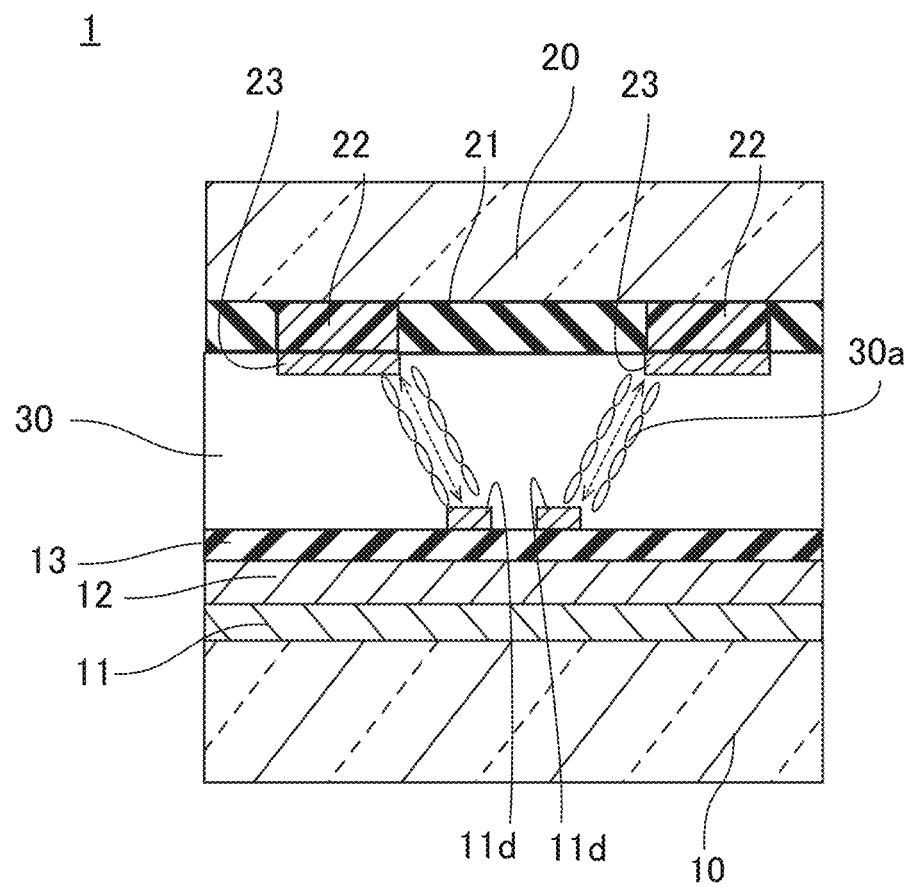
FIG. 3C is a cross-sectional view illustrating a state of the panel module 1 when a black display is performed in the narrow viewing angle mode.

In the case of black display in the narrow viewing angle mode, the viewing angle control circuit 2, for example, performs a controlling operation of applying the common voltage Vcom to the touch sensor electrodes 12 and the pixel electrodes 11d. In addition, the viewing angle control circuit 2 performs a controlling operation of applying an alternating voltage to the counter substrate electrode 23. The absolute value of the alternating voltage is preferably different from the absolute value of the common voltage Vcom. One example is as follows: as shown in FIG. 3C, when the common voltage Vcom is applied to the pixel electrodes 11d, the common voltage Vcom (a voltage that is ±0 V with respect to the common voltage) is also applied to the touch sensor electrodes 12, and an alternating voltage that is ±6 V with respect to the common voltage Vcom is applied to the counter substrate electrode 23. This causes oblique electric fields to be generated between the counter substrate electrode 23 on one side and the touch sensor electrodes 12 and the pixel electrodes 11d on the other side. The liquid crystal molecules 30a of the liquid crystal layer 30, due to the oblique electric fields, form angles with respect to the touch sensor substrate 10. As the alignment direction of the liquid crystal molecules 30a do not change in the surface of the liquid crystal layer 30, the liquid crystal layer 30 does not transmit light from the back of the touch sensor substrate 10, thereby performing black display.

As the liquid crystal molecules 30a form angles with respect to the touch sensor substrate 10, when the panel module 1 is observed in a wide viewing angle range, a display more whitish than black display observed in a narrow viewing angle range is observed.

Figure 3D:
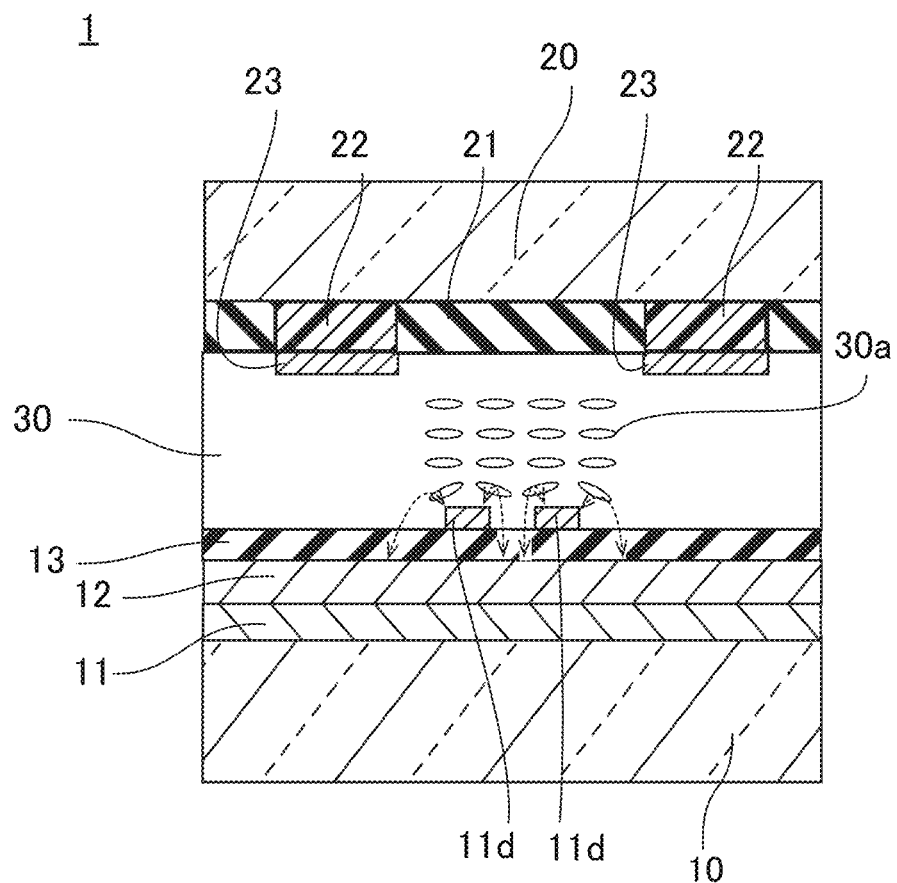
FIG. 3D is a cross-sectional view illustrating a state of the panel module 1 when a white display is performed in a wide viewing angle mode.

In the case of white display in the wide viewing angle mode, the viewing angle control circuit 2, for example, performs a controlling operation of applying the constant voltage (common voltage Vcom) to either the touch sensor electrodes 12 or the pixel electrodes 11d, and applying a potential different from the common voltage Vcom to the other. In addition, the viewing angle control circuit 2 performs a controlling operation of applying, to the counter substrate electrode 23, the constant voltage (common voltage Vcom) that is common to the touch sensor electrodes 12 and the pixel electrodes 11d. One example is as follows: when the common voltage Vcom is applied to the pixel electrodes 11d, an alternating voltage that is ±4 V with respect to the common voltage Vcom is applied to the touch sensor electrodes 12, and the common voltage Vcom, which is common to the touch sensor electrodes 12, is applied to the counter substrate electrode 23. This causes fringe fields to be generated between the touch sensor electrodes 12 and the pixel electrodes 11d, as shown in FIG. 3D. On the other hand, unlike in the narrow viewing angle mode, electric fields in the thickness direction of the liquid crystal layer 30 are small. Therefore, the liquid crystal molecules 30a, due to electric fields generated between the touch sensor electrodes 12 and the pixel electrodes 11d, change the alignment direction, while being aligned in parallel with the touch sensor substrate 10.

Figure 3E:
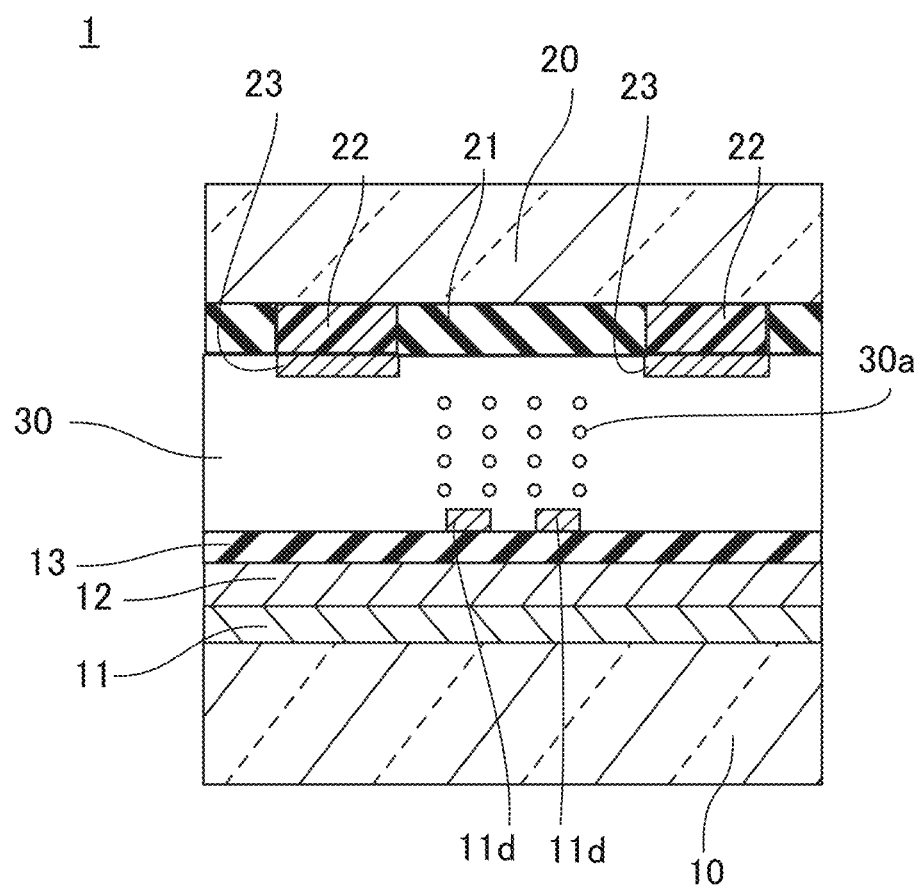
FIG. 3E is a cross-sectional view illustrating a state of the panel module 1 when a black display is performed in the wide viewing angle mode.

In the case of black display in the wide viewing angle mode, the viewing angle control circuit 2, for example, performs a controlling operation of applying the common voltage Vcom to the pixel electrodes 11d and the touch sensor electrodes 12. In addition, the viewing angle control circuit 2 performs a controlling operation of applying, to the counter substrate electrode 23 as well, the constant voltage, which is common to the touch sensor electrodes 12 and the pixel electrodes 11d. As shown in FIG. 3E, no electric field is generated in the liquid crystal layer 30, and hence the liquid crystal molecules 30a are aligned in the initial alignment direction. The initial alignment direction is preferably parallel to the touch sensor substrate 10, and parallel to an absorption axis of a polarizing plate that is not shown in the drawing, when viewed in a plan view.

When the viewing angle of the panel module 1 is set to the wide viewing angle, the viewing angle control circuit 2 supplies a signal having an amplitude smaller than that of the viewing angle control signal S1 shown in FIG. 7 to the counter substrate electrode 23 to decrease a potential difference between the counter substrate electrode 23 and the touch sensor electrodes 12 (common electrodes) to which the voltage Vcom is applied, or to make the potential difference zero. This widens the viewing angle of the panel module 1.

The white display in the narrow viewing angle mode and the white display in the wide viewing angle mode described above can be switched from one to the other by applying a voltage to the counter substrate electrode 23. Similarly, the black display in the narrow viewing angle mode and the black display in the wide viewing angle mode can be switched from one to the other by applying a voltage to the counter substrate electrode 23. This applies to a halftone display. Similarly, the narrow viewing angle mode and the wide viewing angle mode can be switched from one to the other by the application/non-application of an alternating voltage to the counter substrate electrode 23.

In addition, the display control unit 31 sends, to the viewing angle control circuit 2, a frame synchronization signal S2 indicating a frame period switching timing. Then, according to the frame synchronization signal S2, the viewing angle control circuit 2 reverses the polarity of the voltage of the viewing angle control signal S1 with respect to the voltage Vcom. In other words, the viewing angle control circuit 2 reverses the polarity of the voltage of the viewing angle control signal S1 for every one frame period.

Further, the driving control unit 32 sends, to the viewing angle control circuit 2, a driving synchronization signal S3 indicating a timing for supplying a driving signal to the touch sensor electrodes 12. Still further, the display control unit 33 sends, to the viewing angle control circuit 2, a mode switching synchronization signal S4 indicating a timing for switching the display mode and the touch detection mode from one to the other. The display mode and the touch detection mode are switched in one frame period in a time-division manner. For example, the display mode and the touch detection mode are switched a plurality of times alternately in one frame period. Then, based on the mode switching synchronization signal S4, the viewing angle control circuit 2 determines whether the current time is in a period T1 in which the in-cell touch panel device 100 is in the display mode under the control by the touch panel control circuit 3, or it is in a period T2 in which the in-cell touch panel device 100 is in the touch detection mode.

Here, in Embodiment 1, the viewing angle control circuit 2 supplies a load reduction signal S5 to the counter substrate electrode 23 in the period T2 in which the in-cell touch panel device 100 is in the touch detection mode. This load reduction signal S5 is a signal that is in synchronization with the driving signal and that has the same polarity as that of the driving signal. Here, the driving synchronization signal S3 is a signal that is in synchronization with the driving signal and that has the same polarity as that of the driving signal. The viewing angle control circuit 2 generates the load reduction signal S5 by superposing, on the viewing angle control signal S1, a signal that is in synchronization with the driving synchronization signal S3 and that has the same polarity as that of the driving synchronization signal S3. The driving signal has different waveforms in the period T2a and the period T2b of the period T2, respectively, as is the case with the driving synchronization signal S3 shown in FIG. 7. For example, a pulse-like voltage is not included in the driving signal in the period T2a, and a pulse-like voltage is included in the driving signal in the period T2b. In addition, a plurality of the periods T2b are provided in one frame period. The frequencies (width of number of pulses) of the driving signal (the driving synchronization signal S3) in a plurality of the periods T2b may vary with the period T2b, as shown in FIG. 7. Then, as shown in FIG. 7, in the period T2a, the load reduction signal S5 has a base voltage Vb obtained by decreasing the viewing angle control signal S1 by a predetermined voltage, and in the period T2b, it has a voltage value obtained by applying, to the base voltage Vb, a voltage that is in synchronization with the above-described pulse-like voltage, has the same polarity as that of the pulse-like voltage, and has the same amplitude as that of the pulse-like voltage.

Figure 8:
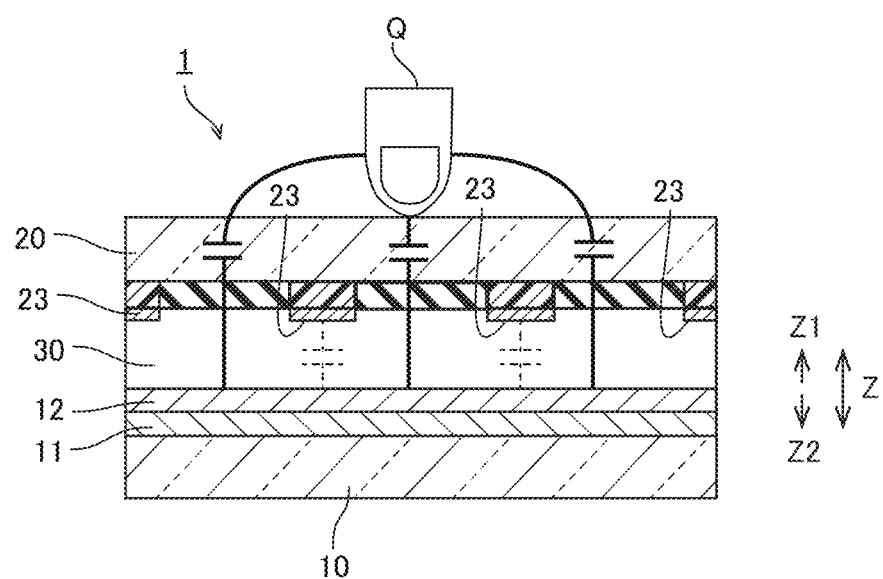
FIG. 8 is a schematic diagram for explaining principles of the reduction of a capacitance that is a load on the counter substrate electrode 23 according to Embodiment 1.
Figure 9:
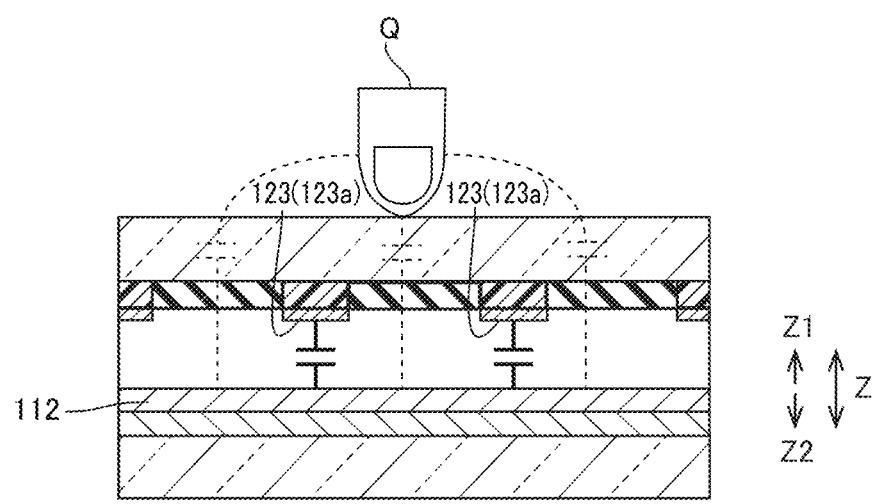
FIG. 9 is a diagram for explaining principles of the generation of a capacitance that is a load, by electrodes 123 of Comparative Example 1 and electrodes 123*a* of Comparative Example 2.

FIG. 8 is a schematic diagram for explaining principles of the reduction of a capacitance that is a load on the counter substrate electrode 23 according to Embodiment 1. FIG. 9 is a diagram for explaining principles of the generation of a capacitance that is a load, by electrodes 123 of Comparative Example 1 and electrodes 123a of Comparative Example 2. The electrodes 123 in Comparative Example 1 are connected to ground (GND). Thus, the potential of the electrodes 123 in Comparative Example 1 is a ground voltage. To the electrodes 123a of Comparative Example 2, the viewing angle control signal is applied, even in a period in which the in-cell touch panel device 100 is in the touch detection mode. Incidentally, the configurations of Comparative Examples 1 and 2 are described for explaining actions and effects of Embodiment 1, and this description is not intended to recognize the configurations of Comparative Examples 1 and 2 as conventional configurations.

The ground voltage and the voltage of the driving signal have different values and waveforms. In addition, the voltages of the viewing angle control signal and the driving signal have different values and waveforms. Therefore, as shown in FIG. 9, the potential of the electrodes 123 of Comparative Example 1 and the potential of the electrodes 123a of Comparative Example 2 have values that are both different from the value of the potential of the touch sensor electrodes 112 to which the driving signal is applied. As a result, electric fields are generated between the electrodes 123 and the touch sensor electrodes 112, whereby capacitances CL that are loads are generated. The capacitances CL, which are loads, hinder the generation of capacitances between an indicator Q and the touch sensor electrodes 112 when the indicator Q touches the panel module, thereby lowering a signal for touch detection.

In contrast, as shown in FIG. 7, the load reduction signal S5, which is a signal that is in synchronization with the driving synchronization signal S3 applied to the touch sensor electrodes 12 and that has the same polarity as that of the driving synchronization signal S3, is applied to the counter substrate electrode 23 according to Embodiment 1. As shown in FIG. 8, therefore, no electric field is generated between the counter substrate electrode 23 and the touch sensor electrodes 12, or an electric field, even if generated, has a minute magnitude. As a result, a capacitance that is a load to touch detection (signal), which results from the counter substrate electrode 23, is reduced, and when an indicator Q touches the panel module 1, the touch of the indicator Q can be detected, with the influences of the counter substrate electrode 23 being reduced. Note that in FIG. 8, the illustration of liquid crystal molecules 30a, the insulating layer 13, and the pixel electrodes 11d is omitted.

Modification Example 1 of Embodiment 1

Figure 10:
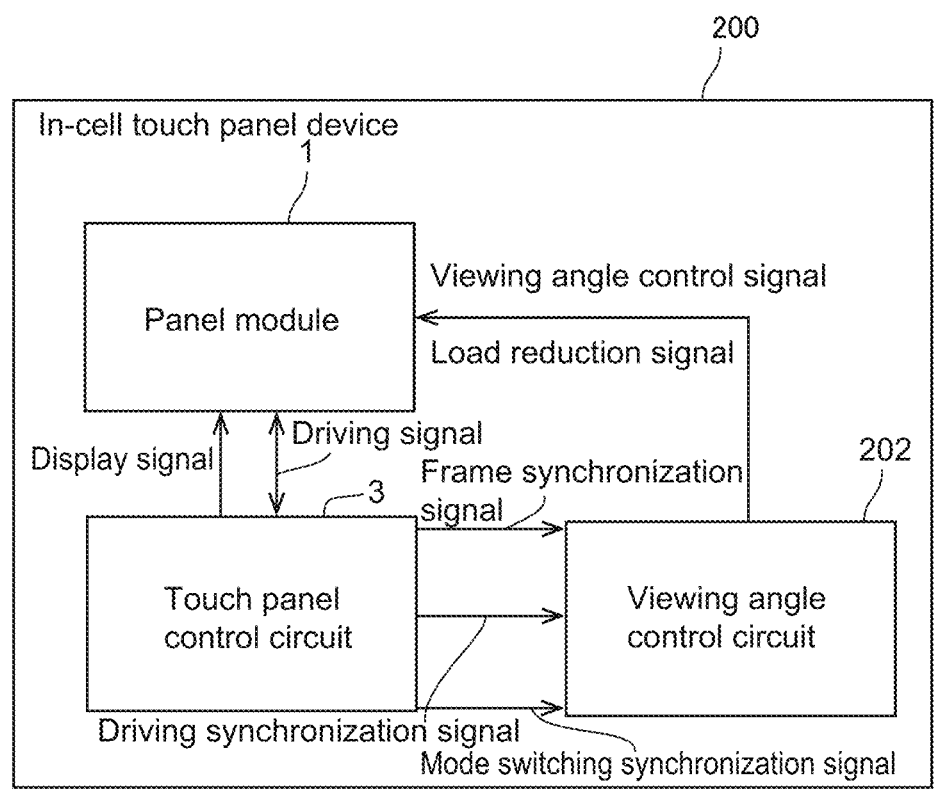
FIG. 10 is a block diagram of an in-cell touch panel device 200 in Modification Example 1 of Embodiment 1.
Figure 11:
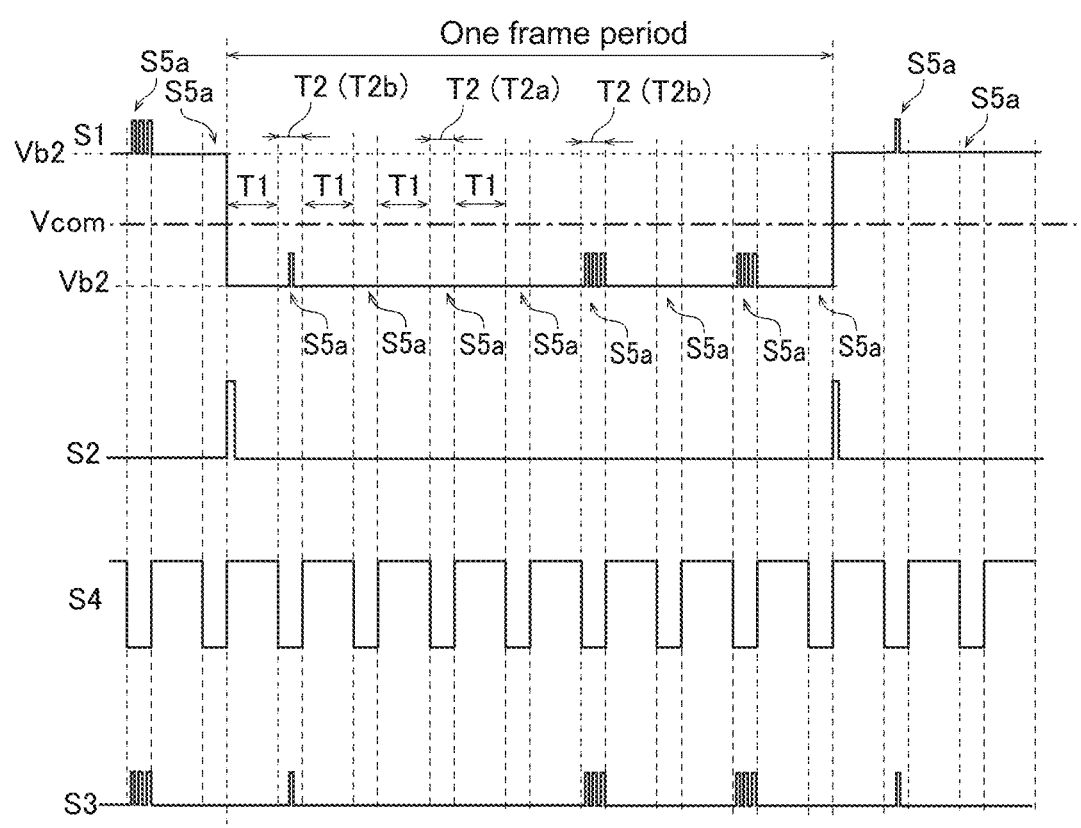
FIG. 11 illustrates exemplary waveforms of signals supplied from the touch panel control circuit 3 to a viewing angle control circuit 202 and signals supplied from the viewing angle control circuit 202 to the panel module 1.

Next, a configuration of an in-cell touch panel device 200 in Modification Example 1 of Embodiment 1 is described with reference to FIGS. 10 and 11. The same constituent members as those in Embodiment 1 are denoted by the same reference symbols and the descriptions of the same are omitted. FIG. 10 is a block diagram of the in-cell touch panel device 200 in Modification Example 1 of Embodiment 1. FIG. 11 illustrates exemplary waveforms of signals supplied from the touch panel control circuit 3 to the viewing angle control circuit 202 and signals supplied from the viewing angle control circuit 202 to the panel module 1.

As illustrated in FIG. 10, the in-cell touch panel device 200 includes a viewing angle control circuit 202.

Here, in Embodiment 1 described above, the viewing angle control circuit 2 is configured so that the base voltage Vb obtained by decreasing the viewing angle control signal S1 by a predetermined voltage is supplied to the counter substrate electrode 23 in the period T2a, and a pulse voltage that is in synchronization with the driving signal and has a positive polarity with respect to the base voltage Vb is supplied to the counter substrate electrode 23 in the period T2b, but the configuration of the present disclosure is not limited to this. The viewing angle control circuit 202, as shown in FIG. 11, supplies, as a base voltage Vb2 of a load reduction signal S5a, the same voltage as that of the viewing angle control signal S1 to the counter substrate electrode 23 in the period T2a, and supplies a load reduction signal S5a to the counter substrate electrode 23 in the period T2b. The load reduction signal S5a is obtained by superposing a pulse voltage that is in synchronization with the driving signal and has a positive polarity on the base voltage Vb2. With this configuration of Modification Example 1, it is possible to reduce capacitances that are loads, generated between the counter substrate electrode 23 and the touch sensor electrodes 12. This results in that the generation of capacitances between the touch sensor electrodes 12 and an indicator is not hindered, and therefore, the performance of touch detection can be prevented from deteriorating even in a case where an electrode is formed on the counter substrate 20. In addition, in Embodiment 1 described above, a power source that outputs two levels of voltage for each of the positive-polarity voltage and the negative-polarity voltage of the viewing angle control signal S1 (i.e., a power source that outputs four levels of voltages in total) is required for generating the load reduction signal S5. In contrast, in Modification Example 1 of Embodiment 1, a power source that outputs one level of voltage for each of the positive-polarity voltage and the negative-polarity voltage of the viewing angle control signal S1 (i.e., a power source that outputs two levels of voltages in total) may be prepared for generating the load reduction signal S5a. As a result, the configuration of the viewing angle control circuit 202 can be simplified as compared with Embodiment 1, and the cost reduction is enabled.

Modification Example 2 of Embodiment 1

Figure 12:
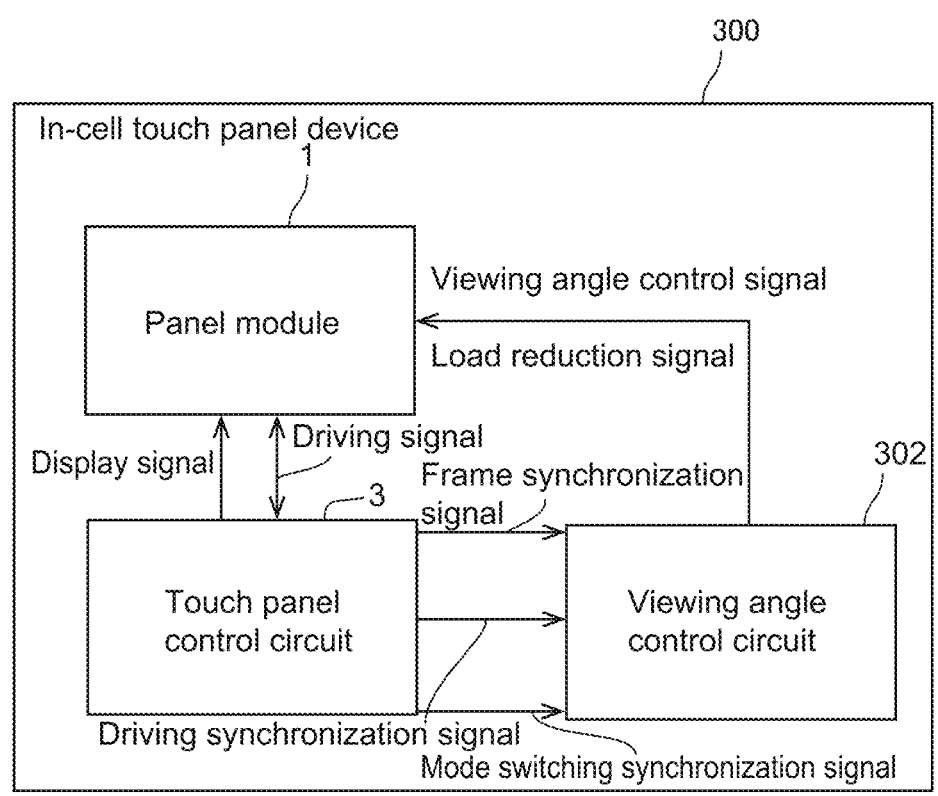
FIG. 12 is a block diagram of an in-cell touch panel device 300 in Modification Example 2 of Embodiment 1.
Figure 13:
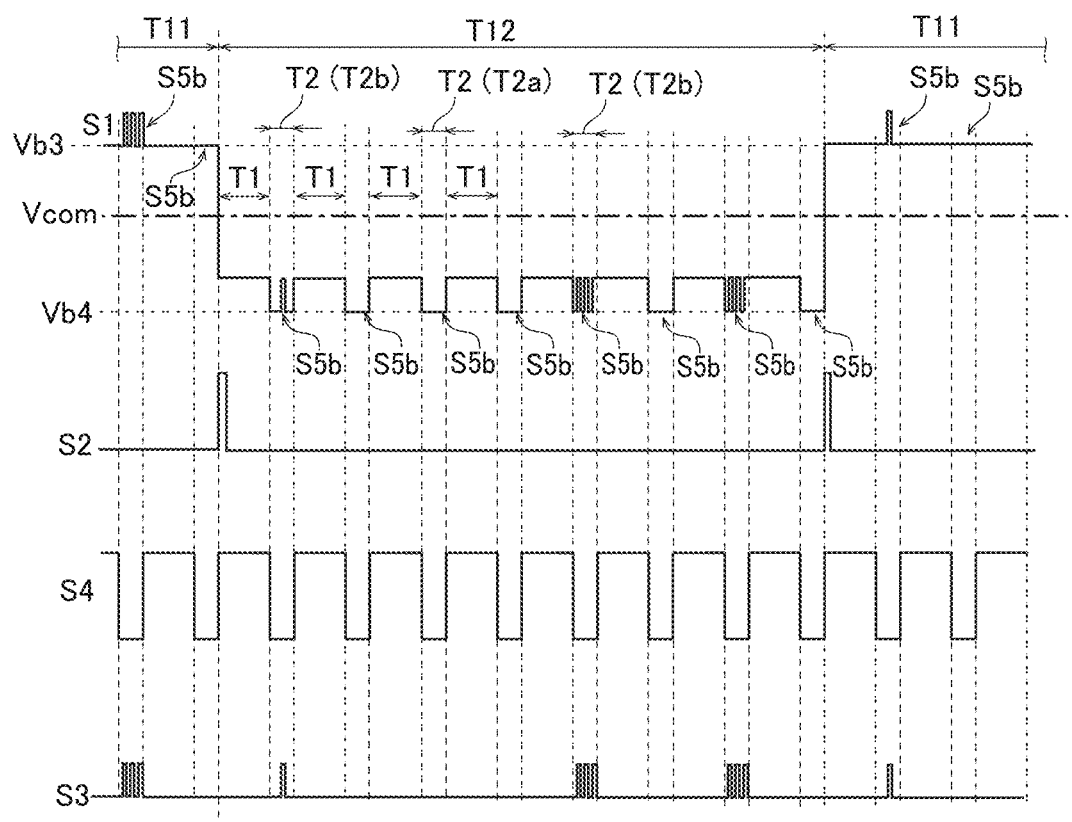
FIG. 13 illustrates exemplary waveforms of signals supplied from the touch panel control circuit 3 to a viewing angle control circuit 302 and signals supplied from the viewing angle control circuit 302 to the panel module 1.

Next, a configuration of an in-cell touch panel device 300 in Modification Example 2 of Embodiment 1 is described with reference to FIGS. 12 and 13. The same constituent members as those in Embodiment 1 are denoted by the same reference symbols and the descriptions of the same are omitted. FIG. 12 is a block diagram of an in-cell touch panel device 300 in Modification Example 2 of Embodiment 1. FIG. 13 illustrates exemplary waveforms of signals supplied from the touch panel control circuit 3 to the viewing angle control circuit 302 and signals supplied from the viewing angle control circuit 302 to the panel module 1.

As illustrated in FIG. 12, the in-cell touch panel device 300 includes a viewing angle control circuit 302.

The viewing angle control circuit 302, as shown in FIG. 13, supplies, as a base voltage Vb3 of a load reduction signal S5b, the same voltage as that of the viewing angle control signal S1 to the counter substrate electrode 23 in a period T11 in which the viewing angle control signal S1 has a voltage of a positive polarity with respect to the voltage Vcom. In addition, the viewing angle control circuit 302 supplies, as a base voltage Vb4 of a load reduction signal S5b, a voltage obtained by lowering the voltage of the viewing angle control signal S1 by the same value as that of the amplitude of the driving signal, to the counter substrate electrode 23 in a period T12 in which the viewing angle control signal S1 has a voltage of a negative polarity with respect to the voltage Vcom. With this configuration of Modification Example 2, it is possible to reduce capacitances that are loads, generated between the counter substrate electrode 23 and the touch sensor electrodes 12. This results in that the generation of capacitances between the touch sensor electrodes 12 and an indicator is not hindered, and therefore, the performance of touch detection can be prevented from deteriorating even in a case where an electrode is formed on the counter substrate 20. In addition, in Modification Example 2 of Embodiment 1, a power source that outputs one level of voltage for each of the positive-polarity voltage and the negative-polarity voltage of the viewing angle control signal S1 (i.e., a power source that outputs two levels of voltages in total) may be prepared for generating the load reduction signal S5b. As a result, the configuration of the viewing angle control circuit 302 can be simplified as compared with Embodiment 1, and the cost reduction is enabled.

Embodiment 2

Figure 14:
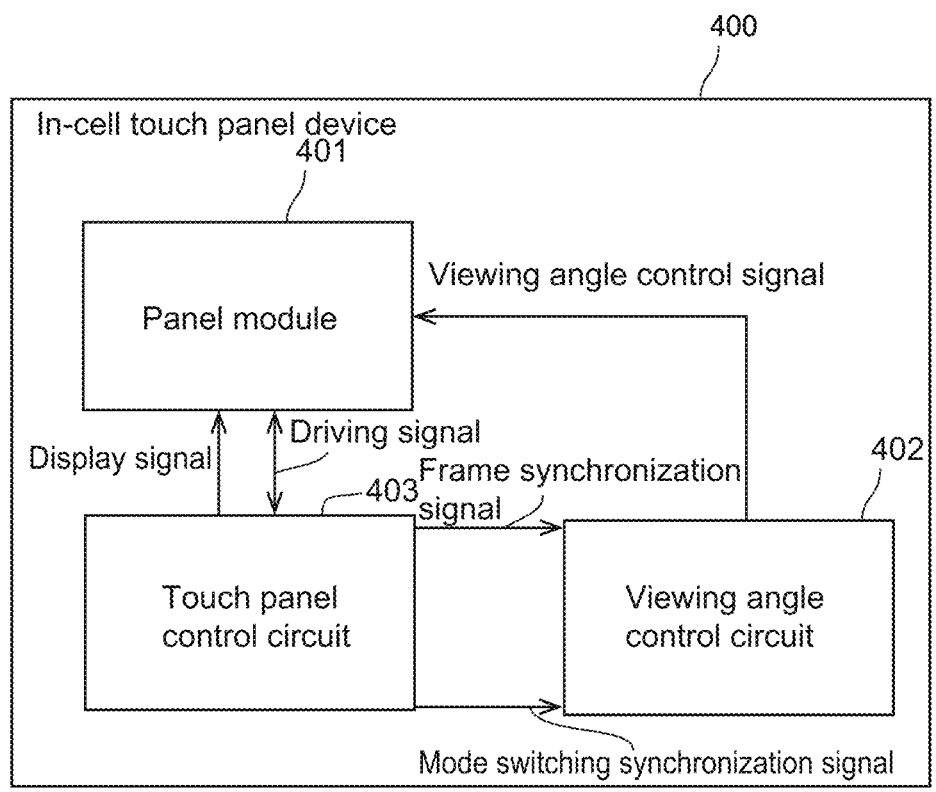
FIG. 14 is a block diagram of an in-cell touch panel device 400 of Embodiment 2.
Figure 15:
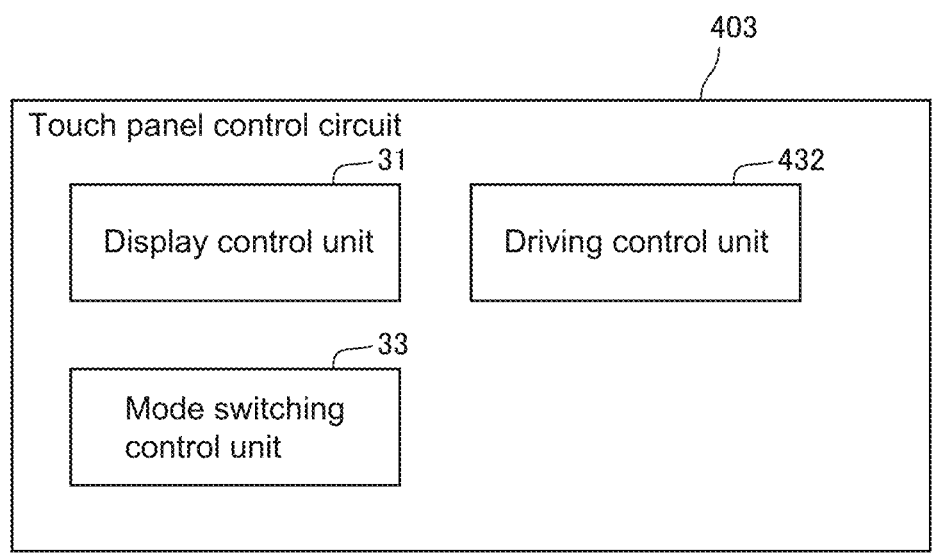
FIG. 15 is a block diagram of a touch panel control circuit 403 of Embodiment 2.
Figure 16:
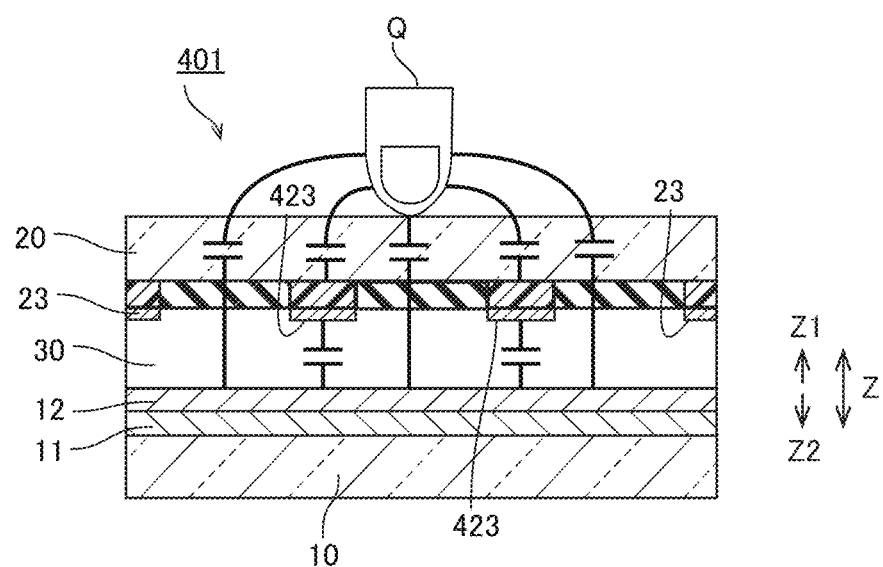
FIG. 16 is a schematic diagram for explaining principles of the reduction of a capacitance that is a load on a counter substrate electrode 423 according to Embodiment 2.
Figure 17:
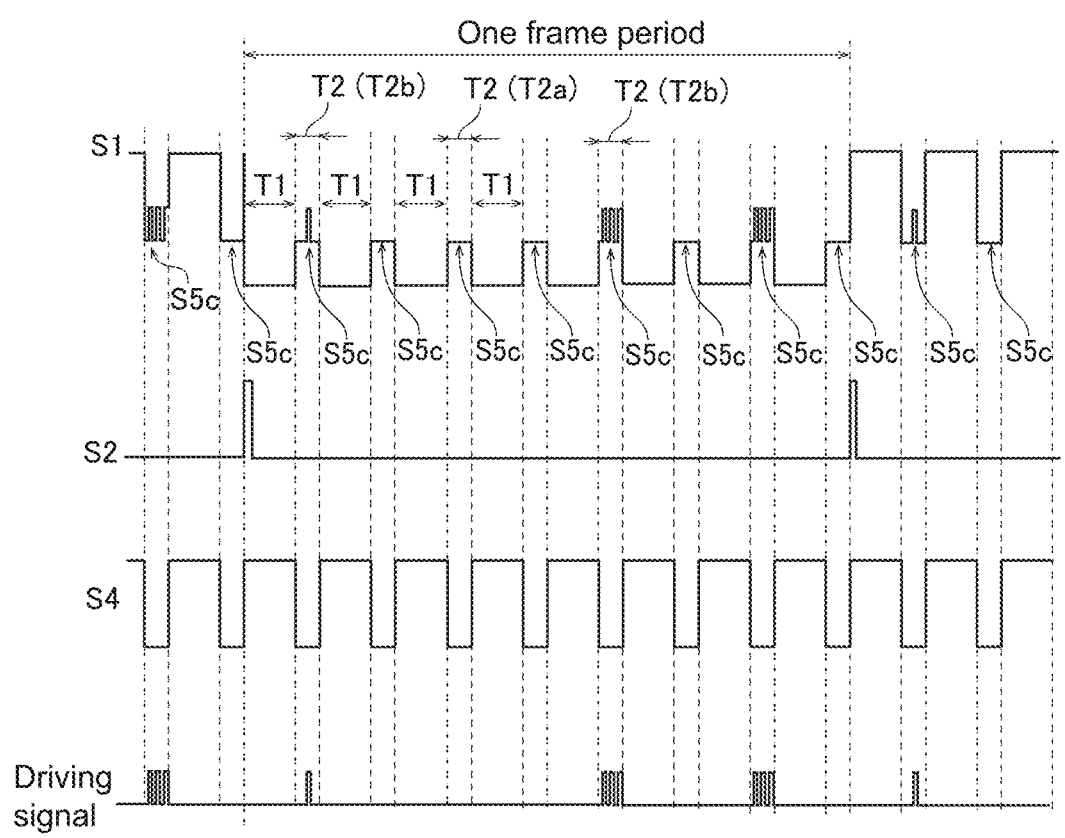
FIG. 17 illustrates exemplary waveforms of signals in an in-cell touch panel device 400 according to Embodiment 2.
Figure 18:
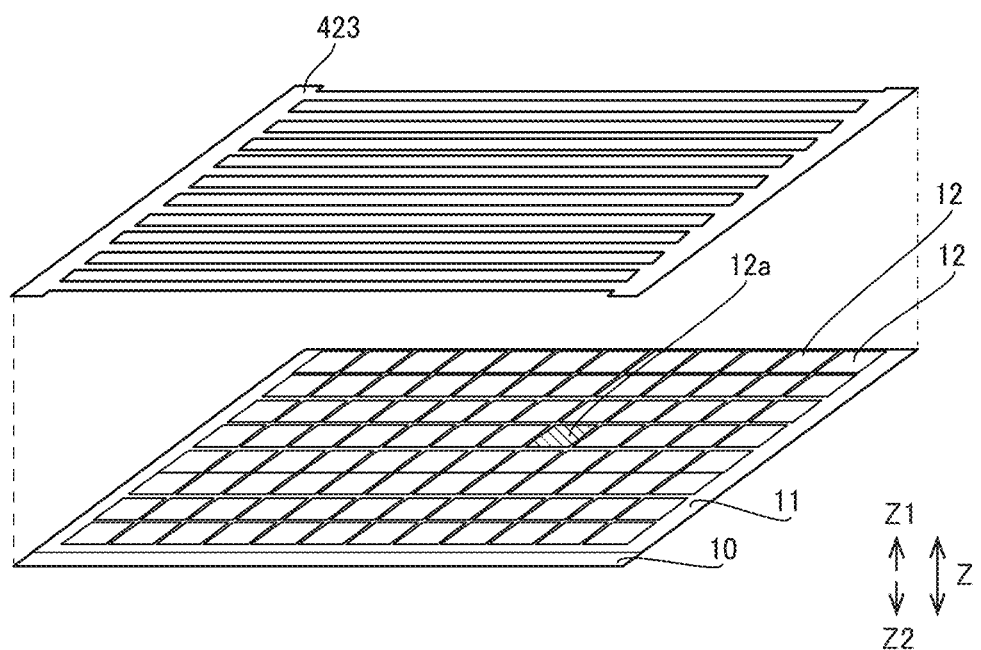
FIG. 18 is a schematic diagram illustrating a configuration of the counter substrate electrode 423.

Next, a configuration of an in-cell touch panel device 400 in Embodiment 2 is described with reference to FIGS. 14 and 18. The same constituent members as those in Embodiment 1 are denoted by the same reference symbols and the descriptions of the same are omitted. FIG. 14 is a block diagram of an in-cell touch panel device 400 of Embodiment 2. FIG. 15 is a block diagram of a touch panel control circuit 403 of Embodiment 2. FIG. 16 is a schematic diagram for explaining principles of the reduction of capacitances that are loads on the counter substrate electrode 423 according to Embodiment 2. FIG. 17 illustrates exemplary waveforms of signals in an in-cell touch panel device 400 according to Embodiment 2. FIG. 18 is a schematic diagram illustrating a configuration of the counter substrate electrode 423.

As illustrated in FIG. 14, the in-cell touch panel device 400 includes a panel module 401, a viewing angle control circuit 402, and a touch panel control circuit 403. Further, as illustrated in FIG. 15, the touch panel control circuit 403 includes a driving control unit 432. The driving control unit 432 does not send a driving synchronization signal S3 to the viewing angle control circuit 402, unlike in Embodiment 1.

Still further, as illustrated in FIG. 16, the panel module 401 includes a counter substrate electrode 423. In Embodiment 2, the viewing angle control circuit 402 supplies the viewing angle control signal S1 to the counter substrate electrode 423 in a period T1 while the in-cell touch panel device 400 is in the display mode, as shown in FIG. 17, and causes the potential of the counter substrate electrode 423 to be in a floating state in a period T2 while the in-cell touch panel device 400 is in the touch detection mode. The "floating state" means a state in which no voltage is directly applied from the power source and there is no connection with ground. Note that in FIG. 16, the illustration of liquid crystal molecules 30a, the insulating layer 13, and the pixel electrodes 11d is omitted.

Here, as shown in FIG. 18, the single counter substrate 423 and a plurality of the touch sensor electrodes 12 are arranged to be opposed to each other. Capacitances, therefore, are generated between the single counter substrate 423 and a plurality of the touch sensor electrodes 12. Here, when a driving signal (see FIG. 17) is supplied to a plurality of the touch sensor electrodes 12, as the potential of the counter substrate electrode 423 is in a floating state, the potential of the counter substrate electrode 423 is made a voltage S5c having the same waveform as that of the driving signal, due to the capacitances between the counter substrate electrode 423 and a plurality of the touch sensor electrodes 12. Therefore, by causing the potential of the counter substrate electrode 423 be in a floating state, the same state as that when the load reduction signal S5 in Embodiment 1 is applied to the counter substrate electrode 423 is achieved consequently. That is, even if capacitances are generated between the counter substrate 423 and a plurality of the touch sensor electrodes 12, these capacitances are not loads. Thus, with the configuration of Embodiment 2 as well, the performance of touch detection can be prevented from deteriorating even in a case where an electrode is formed on the counter substrate 20.

In addition, with the configuration of Embodiment 2, unlike in Embodiment 1, the control for synchronization with a driving signal and the operation for generating the load reduction signal S5 in the viewing angle control circuit 402 are unnecessary. This enables the simplification of the circuit configuration of the viewing angle control circuit 402, and the cost reduction. Note that other constituent members and effects are the same as those of Embodiment 1.

Comparative Examples and Comparison Results

Next, results of measurement of signals detected by the touch sensor electrodes in Embodiments 1 and 2, as well as Comparative Examples 1 and 2 are described with reference to FIG. 19. FIG. 19 is a diagram for explaining measurement results.

In a state in which the potential of the electrodes 123 of Comparative example 1 (see FIG. 9) was set to a ground voltage by connecting the electrodes 123 to ground (GND), touch signals detected by the touch sensor electrodes were measured. As a result, as shown in FIG. 19, a capacitance exceeding a detection limit of the touch panel control circuit was given to the touch sensor electrodes, whereby measured value of the touch signals were in an overflow state (had an unmeasurable value). Further, while the viewing angle control signal was being supplied to the electrodes 123a of Comparative Example 2 (see FIG. 9), touch signals detected by the touch sensor electrodes were measured. As a result, in Comparative Example 2 as well, a capacitance exceeding a detection limit of the touch panel control circuit was given to the touch sensor electrodes, whereby measured values of the touch signals were in an overflow state (had an unmeasurable value).

Still further, while the load reduction signal S5 was being supplied to the counter substrate electrode 23 of Embodiment 1 (see FIG. 3A), touch signals detected by the touch sensor electrodes 12 were measured. As a result, as shown in FIG. 19, the touch signals had values in a touch-detectable range. Still further, in a state in which the potential of the counter substrate electrode 423 of Embodiment 2 (see FIG. 16) was set in the floating state, touch signals detected by the touch sensor electrodes 12 were measured. As a result, as shown in FIG. 19, the touch signals had values in a touch-detectable range. It is therefore proven that in Embodiments 1 and 2, touch detection is enabled even in a case where an electrode is arranged on the counter substrate 20.

Modification Examples

The embodiment of the present disclosure is thus described above, but the above-described embodiment is merely examples for implementing the present disclosure. The present invention, therefore, is not limited to the above-described embodiment, and the above-described embodiment can be appropriately varied and implemented without departing from the spirit and scope of the invention. Modification examples of the above-described embodiments are described below.

Figure 20:
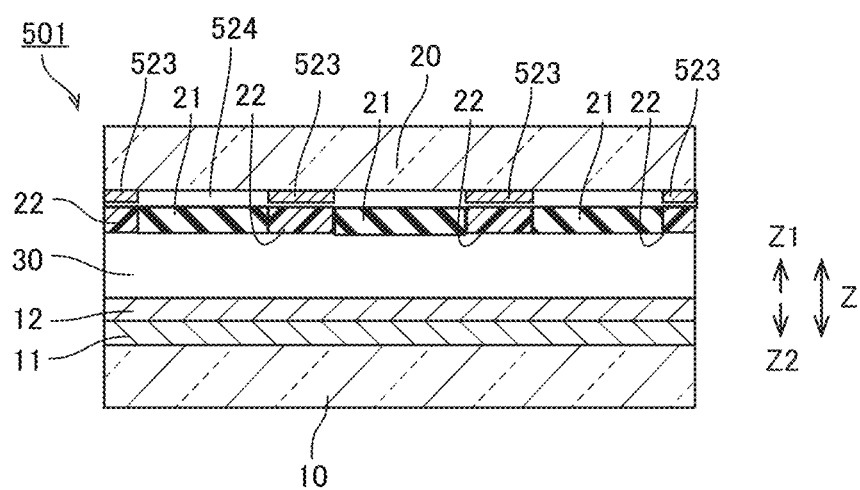
FIG. 20 is a cross-sectional view illustrating a configuration of a panel module 501 according to a modification example of Embodiments 1 and 2.

(1) Embodiments 1 and 2 are described above with reference to examples in which the counter substrate electrode is arranged on the liquid crystal layer side with respect to the color filters and the black matrix, but the present disclosure is not limited to these examples. For example, as is the case with a panel module 501 of a modification example shown in FIG. 20, a counter substrate electrode 523 may be arranged on the counter substrate 20 side (in the Z1 direction) with respect to color filters 21 and a black matrix 22, or, though not shown in the drawings, a counter substrate electrode may be arranged in the same layer as that of the color filters and the black matrix. For example, in a state in which a flattening film 524 covers a liquid crystal layer 30 side of the counter substrate electrode 523, color filters 21 and a black matrix 22 are further formed on the liquid crystal layer 30 side. Note that in FIG. 20, the illustration of liquid crystal molecules 30a, the insulating layer 13, and the pixel electrodes 11d is omitted.

(2) Embodiments 1 and 2 are described above with reference to examples in which a single counter substrate electrode is provided on a panel module as shown in FIGS. 5 and 18, but the present disclosure is not limited to these. For example, a plurality of counter substrate electrode may be provided on a panel module.

(3) Embodiments 1 and 2 are described above with reference to examples in which slit portions are provided in the counter substrate electrode, but the present disclosure is not limited to these. For example, slit portions do not have to be provided in the counter substrate electrode.

(4) Embodiments 1 and 2 are described above with reference to examples in which the counter substrate electrode is arranged at a position that does not overlap with the color filters when viewed in a plan view and overlaps with the black matrix, but the present disclosure is not limited to these examples. For example, when the counter substrate electrode is made of a transparent electrode film, the counter substrate electrode may be arranged at a position that overlaps with the color filters when viewed in a plan view. In this case, the counter substrate electrode does not have to be arranged at a position that overlaps with a black matrix.

(5) Embodiment 1 is described above with reference to an example in which the load reduction signal S5 has a voltage having the same amplitude as that of the voltage of the driving signal, but the present disclosure is not limited to this example. For example, the load reduction signal may have a voltage having an amplitude different from that of the voltage of the driving signal, as long as the load reduction signal is a signal that is in synchronization with the driving signal and that has the same polarity as that of the driving signal.

(6) Embodiments 1 and 2 are described above with reference to examples in which a viewing angle control signal is supplied to the counter substrate electrode in the display mode, but the present disclosure is not limited to these examples. In other words, the viewing angle control signal does not have to be supplied to the counter substrate electrode in the display mode, and a signal different from the viewing angle control signal may be supplied to the counter substrate electrode.

(7) Embodiments 1 and 2 are described above with reference to examples in which the counter substrate electrode is arranged at a position that overlaps with portions of a black matrix arranged in Y-direction spaces between a plurality of color filters as shown in FIGS. 2A and 2B, but the present disclosure is not limited to these examples. That is, the counter substrate electrode may be arranged at positions that overlap with portions of the black matrix arranged in X-direction spaces between a plurality of color filters.

The above-described in-cell touch panel can be described also as follows.

An in-cell touch panel according to a first configuration includes: a touch sensor substrate; a pixel electrode formed on the touch sensor substrate; a touch sensor electrode formed on the touch sensor substrate; a counter substrate arranged to be opposed to the touch sensor substrate; a counter substrate electrode formed on the counter substrate, the counter substrate electrode being not used in touch detection; a liquid crystal layer arranged between the touch sensor substrate and the counter substrate; a driving control circuit that supplies a driving signal to the touch sensor electrode; a display control circuit that supplies a display signal to the pixel electrode; a mode switching control circuit that switches, in a time-division manner, an operation mode of the in-cell touch panel between a display mode in which the display signal is supplied by the display control circuit to the pixel electrode, and a touch detection mode in which the driving signal is supplied by the driving control circuit to the touch sensor electrode; and a counter substrate electrode control circuit that supplies the counter substrate electrode with a signal that is in synchronization with the driving signal and that has the same polarity as that of the driving signal in a period while the in-cell touch panel is in the touch detection mode, or causes the potential of the counter substrate electrode to be in a floating state in a period while the in-cell touch panel is in the touch detection mode (the first configuration).

With the first configuration, it is possible to reduce capacitances that are loads, generated between the counter substrate electrode and the touch sensor electrode, when a signal that is in synchronization with a driving signal and has the same polarity as that of the driving signal is supplied to the counter substrate electrode. In addition, even in a case where the potential of the counter substrate electrode is made in a floating state, it is possible to reduce capacitances that are loads, generated between the counter substrate electrode and the touch sensor electrode. This results in that the generation of capacitances between the touch sensor electrode and an indicator is not hindered, and therefore, the performance of touch detection can be prevented from deteriorating even in a case where an electrode that is not used in touch detection is formed on the counter substrate.

The in-cell touch panel in the first configuration may further include a black matrix arranged on the counter substrate, wherein the counter substrate electrode may be arranged at a position that overlaps with the black matrix when viewed in a plan view (the second configuration).

According to the second configuration, as the counter substrate electrode is arranged at a position that overlaps with the black matrix for blocking light, display is not affected even when light is absorbed or diffused by the counter substrate electrode. As a result, the counter substrate electrode, even if arranged on the counter substrate, does not affect the display.

The in-cell touch panel in the first or second configuration may further include a color filter arranged on the counter substrate, wherein the counter substrate electrode may be arranged at a position that does not overlap with the color filter when viewed in a plan view (the third configuration).

According to the third configuration, the counter substrate electrode does not block light entering the color filter, or light emitted from the color filter, and therefore the counter substrate electrode, even if arranged on the counter substrate, does not affect the display.

In any one of the first to third configurations, the counter substrate electrode control circuit may be configured to supply the counter substrate electrode with a viewing angle control signal for changing a viewing angle, in a period while the in-cell touch panel is in the display mode (the fourth configuration).

With the fourth configuration, it is possible to change the viewing angle of the in-cell touch panel without deteriorating the performance of touch detection.

In the fourth configuration, a counter substrate electrode control circuit may be configured to: in the period while the in-cell touch panel is in the display mode, when the viewing angle is set to a narrow viewing angle, supply a first viewing angle control signal to the counter substrate electrode, thereby causing a potential difference to occur between the counter substrate electrode and the touch sensor electrode; and in the period while the in-cell touch panel is in the display mode, when the viewing angle is set to a wide viewing angle, supply the counter substrate electrode with a second viewing angle control signal having an amplitude smaller than that of the first viewing angle control signal, or makes the potential difference zero (the fifth configuration).

In any one of the first to third configurations, the counter substrate electrode control circuit may be configured to, in a period while the in-cell touch panel is in the touch detection mode, supply the counter substrate electrode with a first base voltage obtained by decreasing a viewing angle control signal by a predetermined volage, and supply the counter substrate electrode with a voltage obtained by superposing, on the first base voltage, a pulse-like voltage that is in synchronization with the driving signal and that has the same polarity and amplitude as those of the driving signal (the sixth configuration).

In any one of the first to third configurations, the counter substrate electrode control circuit may be configured to, in a period while the in-cell touch panel is in the touch detection mode, supply the counter substrate electrode with a second base voltage identical to a viewing angle control signal, and supply the counter substrate electrode with a voltage obtained by superposing, on the second base voltage, a pulse voltage that is in synchronization with the driving signal and that has a positive polarity (the seventh configuration).

In any one of the first to third configurations, the counter substrate electrode control circuit may be configured to, in a period while the in-cell touch panel is in the touch detection mode and a voltage of a viewing angle control signal has a positive polarity with respect to a voltage of the touch sensor electrode, supply the counter substrate electrode with a second base voltage identical to the viewing angle control signal, and in a period while the in-cell touch panel is in the touch detection mode and the voltage of the viewing angle control signal has a negative polarity with respect to the voltage of the touch sensor electrode, supply the counter substrate electrode with a third base voltage obtained by decreasing the viewing angle control signal by a value identical to that of the amplitude of the driving signal (the eighth configuration).

What is claimed is:

1. An in-cell touch panel comprising:
   a touch sensor substrate;
   a pixel electrode formed on the touch sensor substrate;
   a touch sensor electrode formed on the touch sensor substrate;
   a counter substrate arranged to be opposed to the touch sensor substrate;
   a counter substrate electrode formed on the counter substrate, the counter substrate electrode being not used in touch detection;
   a liquid crystal layer arranged between the touch sensor substrate and the counter substrate;
   a driving control circuit that supplies a driving signal to the touch sensor electrode;
   a display control circuit that supplies a display signal to the pixel electrode;
   a mode switching control circuit that switches, in a time-division manner, an operation mode of the in-cell touch panel between a display mode in which the display signal is supplied by the display control circuit to the pixel electrode, and a touch detection mode in which the driving signal is supplied by the driving control circuit to the touch sensor electrode; and
   a counter substrate electrode control circuit that supplies the counter substrate electrode with a signal that is in synchronization with the driving signal and that has the same polarity as that of the driving signal in a period while the in-cell touch panel is in the touch detection mode, or causes the potential of the counter substrate electrode to be in a floating state in a period while the in-cell touch panel is in the touch detection mode.

2. The in-cell touch panel according to claim 1, further comprising a black matrix arranged on the counter substrate, wherein the counter substrate electrode is arranged at a position that overlaps with the black matrix when viewed in a plan view.

3. The in-cell touch panel according to claim 1, further comprising a color filter arranged on the counter substrate, wherein the counter substrate electrode is arranged at a position that does not overlap with the color filter when viewed in a plan view.

4. The in-cell touch panel according to claim 1, wherein the counter substrate electrode control circuit supplies the counter substrate electrode with a viewing angle control signal for changing a viewing angle, in a period while the in-cell touch panel is in the display mode.

5. The in-cell touch panel according to claim 4, wherein in the period while the in-cell touch panel is in the display mode, when the viewing angle is set to a narrow viewing angle, the counter substrate electrode control circuit supplies a first viewing angle control signal to the counter substrate electrode, thereby causing a potential difference to occur between the counter substrate electrode and the touch sensor electrode, and in the period while the in-cell touch panel is in the display mode, when the viewing angle is set to a wide viewing angle, the counter substrate electrode control circuit supplies the counter substrate electrode with a second viewing angle control signal having an amplitude smaller than that of the first viewing angle control signal, or makes the potential difference zero.

6. The in-cell touch panel according to claim 1, wherein, in a period while the in-cell touch panel is in the touch detection mode, the counter substrate electrode control circuit supplies the counter substrate electrode with a first base voltage obtained by decreasing a viewing angle control signal for changing a viewing angle, by a predetermined voltage, and supplies the counter substrate electrode with a voltage obtained by superposing, on the first base voltage, a pulse-like voltage that is in synchronization with the driving signal and that has the same polarity and amplitude as those of the driving signal.

7. The in-cell touch panel according to claim 1, wherein, in a period while the in-cell touch panel is in the touch detection mode, the counter substrate electrode control circuit supplies the counter substrate electrode with a second base voltage identical to a viewing angle control signal for changing a viewing angle, and supplies the counter substrate electrode with a voltage obtained by superposing, on the second base voltage, a pulse voltage that is in synchronization with the driving signal and that has a positive polarity.

8. The in-cell touch panel according to claim 1, wherein in a period while the in-cell touch panel is in the touch detection mode and a voltage of a viewing angle control signal for changing a viewing angle has a positive polarity with respect to a voltage of the touch sensor electrode, the counter substrate electrode control circuit supplies the counter substrate electrode with a second base voltage identical to the viewing angle control signal, and in a period while the in-cell touch panel is in the touch detection mode and the voltage of the viewing angle control signal has a negative polarity with respect to the voltage of the touch sensor electrode, the counter substrate electrode control circuit supplies the counter substrate electrode with a third base voltage obtained by decreasing the voltage of the viewing angle control signal by a value identical to that of the amplitude of the driving signal.

\* \* \* \* \*